April 8, 1947.   H. K. LINZELL ET AL   2,418,590
PROCESS OF MAKING ANHYDROUS CALCIUM SULFATE
Filed May 4, 1944   3 Sheets-Sheet 1

Patented Apr. 8, 1947

2,418,590

UNITED STATES PATENT OFFICE 2,418,590

PROCESS OF MAKING ANHYDROUS CALCIUM SULPHATE

Harry K. Linzell, Long Lake, Ill., Harold E. Simpson, Pittsburgh, Pa., and Manvel C. Dailey, Elmhurst, Ill., assignors to United States Gypsum Company, Chicago, Ill., a corporation of Illinois Application May 4, 1944, Serial No. 534,034

18 Claims. (Cl. 23—122)

The present invention relates to a process of making a new form of insoluble calcium sulfate anhydrite, characterized by very fine crystal size, high plasticity, high water carrying capacity and consisting of minute agglomerated crystal masses, individual crystals having a tendency toward rounded edges and an absence of elongated and acicular particles.

The invention, moreover, also relates to a process of manufacture of this particular type of insoluble anhydrite which is derived from pulverized gypsum ($CaSO_4.2H_2O$), from calcium sulfate hemihydrate ($CaSO_4.\frac{1}{2}H_2O$), or from the soluble form of calcium sulfate anhydrite ($CaSO_4$), by the expedient of calcining any of these three products in substantially dry form, and in the presence of an acid-reacting substance, at temperatures within the range of from 212° to 500° F.

One of the objects of the invention is to produce insoluble calcium sulfate anhydrite in a calcining kettle, at what are unusually low temperatures for the manufacture of this material.

A further object of the invention is to provide a process for the manufacture of insoluble anhydrite by calcining a water-reactive or completely hydrated form of calcium sulfate in the presence of certain strong mineral acids such as sulfuric or phosphoric acids, phosphorus pentoxide and other inorganic acid-reacting substances, as more fully explained hereinbelow.

It has been found that by the practice of the present invention a desirable form of insoluble anhydrite can be produced which is particularly useful as a filler, such as in paper making or for other purposes where a relatively non-reactive type of calcium sulfate is desired. However, the invention is not limited entirely to the production of the most insoluble form of anhydrite, as there are several degrees of this, the properties of the product in some respects changing with the conditions of the calcination.

A further object of the invention also relates to steps in the process which involve the neutralization of the finished product or the intermediate products which form during its manufacture, by means of alkaline reacting substances, and particularly with some form of lime such as either calcium oxide or calcium hydroxide.

Several sheets of drawings form a part of the present disclosure. In these

Fig. 1 is in the form of a chart illustrating the time and temperature relationship in the calcination of gypsum as practiced in accordance with the prior art, in order to bring out, by comparison with the other figures, the essential differences, which characterize the present invention; and Figs. 2 to 5 inclusive are similar charts, showing the operation in accordance with a number of specific examples, hereinafter more completely described.

These drawings will be described in further detail hereinbelow.

Hitherto, insoluble anhydrite ($CaSO_4$) has been commercially manufactured by the calcination of gypsum rock at a relatively high temperature, this being done either in a rotary calciner or in stationary downdraft kilns similar to those employed for burning brick. The temperatures at which the material discharges from such calciners or kilns may vary between 800 and 1800° F., depending upon the quality desired in the finished product. Ordinarily the calcining time is about one and one-half to three and one-half hours in the rotary calciner, and about three to four days in the downdraft kiln.

When dry gypsum is heated the following phase changes occur progressively as calcination proceeds:

Gypsum ($CaSO_4.2H_2O$) →

Hemihydrate ($CaSO_4.\frac{1}{2}H_2O$) →

Soluble anhydrite ($CaSO_4$) →

Insoluble anhydrite ($CaSO_4$)

In our new process insoluble anhydrite is formed directly from dihydrate, hemihydrate, or soluble anhydrite without intermediate phase formation.

In normal commercial calcination, hemihydrate ($CaSO_4.\frac{1}{2}H_2O$) is formed at temperatures of 225 to 275° F. This is the ordinary plaster of Paris or calcined gypsum of commerce. It "rehydrates" rapidly when mixed with water, setting within 25-40 minutes to form a cement consisting of dihydrate ($CaSO_4.2H_2O$).

Hemihydrate is completely dehydrated to form "soluble anhydrite" upon continued heating. In commercial kettles, transformation occurs at 370-380° F. "Soluble anhydrite" is physically and chemically similar to hemihydrate. The product is unstable, rapidly absorbing moisture from the air to form hemihydrate. It is used commercially as a drying agent. Crystallographically, it is similar to hemihydrate, possessing the same crystal structure and habit, indices of refraction, etc. Soluble anhydrite "sets" in contact with water to form a cement in the same manner as "hemihydrate."

Continued heating of "soluble anhydrite" results in its eventual conversion to "insoluble anhydrite." This conversion does not occur at any definite transition temperature under "dry" calcination conditions. Newman and Wells (Bureau of Standards Journal of Research, 20, 825) report obtaining a mixture of soluble and insoluble anhydrites by heating gypsum for 670 hours at 392° F. A sample heated for one hour at 797° F. still contained anhydrite. Apparent complete conversion was obtained by heating for 30 minutes at 932° F. This slow rate of reaction at calcination temperatures below 800–1000° F. explains the need for use of high temperatures and long calcination times in former processes for the commercial production of insoluble anhydrite.

Insoluble anhydrite differs markedly from hemihydrate and soluble anhydrite in physical characteristics. In contact with water it "rehydrates" very slowly, and does not "set" except in presence of chemical "accelerators" such as $K_2SO_4$, $Al_2(SO_4)_3$, $ZnSO_4$, etc. It is stable and not hygroscopic. Insoluble anhydrite is mineralogically identical with the naturally occurring mineral, anhydrite, possessing the same crystallographic structure, X-ray diffraction pattern, etc. The finely powdered variety prepared by high temperature calcination of gypsum is mixed with "set" accelerators and sold as "Keene's cement"; or in Europe as "Estrich gypsum." Other uses of the product (not accelerated) include use as paper filler, paint extenders, etc.

It has now been found that in accordance with the present invention, the production of insoluble anhydrite can be achieved in the ordinary kettle-calcining equipment commonly employed in the manufacture of plaster of Paris. This objective is obtained by conducting the calcination in the presence of relatively small amounts of certain acid-reacting inorganic substances, such for example as sulfuric or phosphoric acids, phosphorus pentoxide, or acid-reacting sulfates such as sodium acid sulfate, potassium acid sulfate and their equivalents, and with calcination completed at temperatures as low as 250° F.

The product obtained is a finely crystalline form of insoluble anhydrite. For most uses it is equivalent to artificial anhydrite prepared by known high temperature calcination methods. For example, it makes a very satisfactory Keene's cement. Its extremely fine unit crystal size adapts it particularly for use as a filler in rubber products, for the coating of paper, and as a pigment for paints and calcimines.

When it is considered that the commercial manufacture of the Keene's cement is a rather expensive and cumbersome procedure, and which has to be carried out in large kilns and at high operating temperatures, all of which are out of operation during the loading and unloading, and require a long time to bring them up to heat and to cool them down, or made in rotary kilns at high temperatures, it will be readily appreciated that a process such as that of the present invention which enables the production of a material of the same general kind, but much more cheaply and rapidly, affords many technological advantages. Moreover, the properties of the final product can be controlled, to a considerable extent, by the operating conditions and also by subsequent grinding to various degrees of fineness and states of aggregation.

It has been found that the insoluble anhydrite may be formed either from ordinary gypsum, that is to say calcium sulfate dihydrate, from hemihydrate, or from soluble anhydrite; and that the final product in all cases can be the product described and claimed hereinbelow.

The following examples will serve to illustrate means by which the improved anhydrite may be produced.

EXAMPLE 1

Manufacture of anhydrite from gypsum

Finely ground gypsum powder similar to that used in the manufacture of normal plaster of Paris or hemihydrate is charged into a calcining kettle consisting of a vertically placed cylindrical shell, usually heated through its bottom and sides and through flues extending horizontally through the kettle and provided with agitators or scrapers to keep the material in motion during its calcination. The temperature is brought to the hemihydrate conversion temperature of about 250° F. This is also sometimes known by the operator as the "first drag," and is the temperature at which gypsum, $CaSO_4.2H_2O$, loses 1½ molecules of water to form calcium sulfate hemihydrate under normal calcination conditions. During this "drag" period there is no rise in temperature, as all of the heat which enters the kettle is utilized in maintaining the reaction. At the start of "drag" a small percentage of sulfuric acid is sprayed, poured, or otherwise introduced into the kettle containing the gypsum. The acid is permitted to become thoroughly mixed with the gypsum by continuing the agitation thereof. The amount of acid required is rather small, and may vary from 0.5% to about 5.0% by weight of the total initial charge of gypsum. Acid requirements are determined by (a) purity of the gypsum rock; and (b) quality of the "anhydrite" desired. Sufficient acid must be added to neutralize any carbonate or alkaline impurities present in the original rock, plus an excess of 0.5% minimum, as based on the weight of the original gypsum. The acid limits of 0.5–5.0% are based on requirements over and above the amount of acid needed to neutralize the said carbonate or alkaline impurities. Increasing the amount of excess acid will in general result in production of anhydrite of a decreasing rate of reactivity, or rate of rehydration when mixed with water. The useful range of acid is from about 0.5% to about 10%.

The addition of the acid is accompanied by a decided drop in material temperature, which, if the temperature was 250° F. at the time the acid was added, may drop to about 212° F.; this despite the fact that the rate of heat input, i. e. the firing rate, has not been changed in any respect. Thereafter the temperature will again, but very slowly, rise, until a temperature of about 230° is reached, and thereafter the rise will be quite rapid.

When this stage of rapid increase in temperature is reached, samples are taken from the kettle, and an analysis made of the amount of actual free sulfuric acid present. This rapid increase in temperature is an indication that the conversion to insoluble anhydrite is completed. Lime, $(Ca(OH)_2)$, or other alkali may be added to the kettle in amounts sufficient to neutralize residual excess acid, following completion of conversion of the gypsum being treated to the insoluble anhydrite. It is advantageous to accomplish this neutralization when the material in the kettle has reached a temperature of about 300° F. The temperature may then be allowed to rise to as high as 350° or 400° F., whereafter the kettle is dumped and the product allowed to cool. The results of this operation are the formation, not of calcium sulfate hemihydrate, but of insoluble anhydrite. The product resulting is one of high consistency. After the product has cooled, it is preferably reground in order to break up any small aggregations which may have formed. Its properties in other respects will be discussed hereinbelow in connection with anhydrite produced from other forms of gypsum.

As an alternative to the addition of the acid at the time that the gypsum in the kettle has attained the temperature of the so-called "first-settle" (i. e. about 250° F.), the process may be carried out by addition of the acid-reacting material, such as the sulfuric acid, to the pulverulent gypsum prior to charging it to the kettle, or at any time before reaching the "drag" temperature of 250° F. In such case, conversion to insoluble anhydrite begins at approximately 212° F. The results obtained by this alternative operation are in all essential respects the same as those obtained when adding the acid-reacting material after the contents of the calcining kettle have reached, say, 250° F.; and this modification of the manner of carrying out the invention is to be considered as fully within the scope thereof.

EXAMPLE 2

*Production of anhydrite from calcium sulfate hemihydrate*

The process of Example 2 is quite similar to that of Example 1, with the exception that instead of adding the sulfuric acid at the start of the operation, or when the material in the kettle reaches 250° F., addition of the acidic material is delayed until calcination to the hemihydrate is essentially complete. In this modification of the process, acid is added at a kettle material temperature of 260-350° F., using the same amounts, calculated in the same manner as described in connection with Example 1. The addition of the acid-reacting material at this point also causes a lowering of the calcination temperature, but the recovery of the temperature is quite rapid. The contents of the kettle are then analyzed for free acidity and the proper amount of lime, such as calcium hydroxide, is added, and the kettle then dumped at 350° to 400° F. This procedure therefore involves the formation of the insoluble anhydrite directly from calcium sulfate hemihydrate. It will of course be obvious that one could charge a kettle with a suitable quantity of previously calcined hemihydrate and proceed as outlined, with acid added at any time prior to conversion of the hemihydrate to the soluble anhydrite. In either event, however, the consistency of a product made from hemihydrate is lower than that which is made directly from gypsum, as in Example 1.

EXAMPLE 3

*Insoluble anhydrite from soluble anhydrite*

Still another method of forming a product within contemplation of the present invention is to permit the calcination in the kettle to continue to the production of soluble anhydrite before addition of the acid. Material temperature at this point will be about 380° F. Acid or acid-reacting material in the amount indicated in connection with Examples 1 and 2 is then added, but the effect is quite different; instead of causing a lowering of the temperature, the addition of the acid causes a very sudden advance in temperature, which latter may reach as high as 475°-500° F. Irrespective of this rise in temperature, however, the reaction between the calcium sulfate in the soluble anhydrite form, and the added sulfuric acid, is allowed to continue for about ½ hour, followed by neutralization of excess acid by added lime, if desired. The resulting product in this case is very low in consistency and may be used in the production of a very high grade Keene's cement.

EXAMPLE 4

*Insoluble anhydrite by use of phosphoric acid*

Phosphoric acid or equivalent amounts of phosphoric anhydride ($P_2O_5$) may be employed as a substitute for sulfuric acid in producing insoluble anhydrite by the process in a manner similar to that disclosed under Examples 1 to 3 inclusive. Acid requirements are greater for phosphoric than for sulfuric acid, an excess of approximately 1.0% for the former being generally required to produce complete conversion to insoluble anhydrite at calcination temperatures below 500° F. Anhydrite prepared in the presence of phosphoric acid possesses qualities which for some uses are preferable to anhydrite made by calcination in presence of sulfuric acid. For example, the rate of rehydration, in the presence of water, of "phosphate" anhydrite, (i. e. anhydrite made with the use of phosphoric acid) is considerably slower than the rate of rehydration of "sulfate" anhydrite. "Phosphate" anhydrite also has a slower rate of solubility in water. These qualities are advantageous in such products as paper fillers and coatings, toothpaste fillers, water paint pigment extenders, and for other purposes where stability in the presence of water is a requisite.

Combination use of sulfuric and phosphoric acids is considered within the scope of the present invention. For example, carbonate and alkaline impurities may be neutralized by the addition of the required amount of sulfuric acid, phosphoric acid then being employed to effect the anhydrite formation.

In applying our process as described under Examples 2 and 3, it is obvious that, if desired, hemihydrate or soluble anhydrite, previously calcined by any known method, may be charged into a suitable kettle and converted directly to insoluble anhydrite by further calcination in the presence of acid. When starting with cold hemihydrate or soluble anhydrite, conversion to insoluble anhydrite occurs at temperatures from 212° to 250° F.

The accompanying drawings are graphs illustrating typical material-temperature-time relationships obtained in normal production of insoluble anhydrite by the processes of the present invention.

Figure 1:
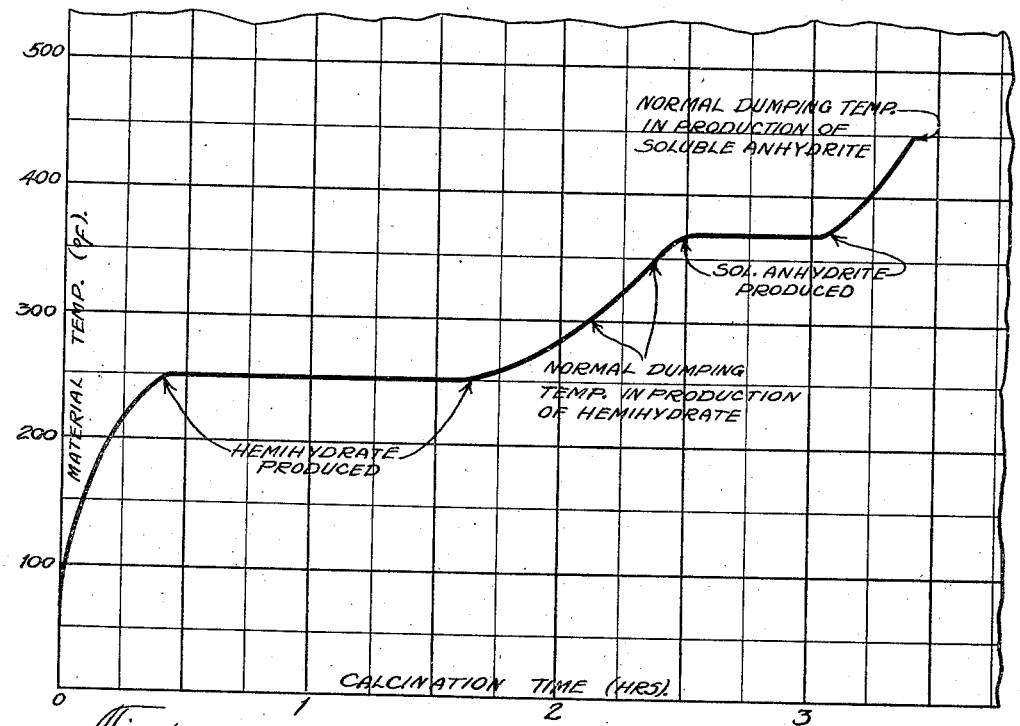
Figure 1 is representative of material temperatures in a kettle during "normal" calcination of gypsum to produce hemihydrate or soluble anhydrite, as practiced in prior art operations. This will serve as a standard of comparison when considering the other figures.
Figure 2:
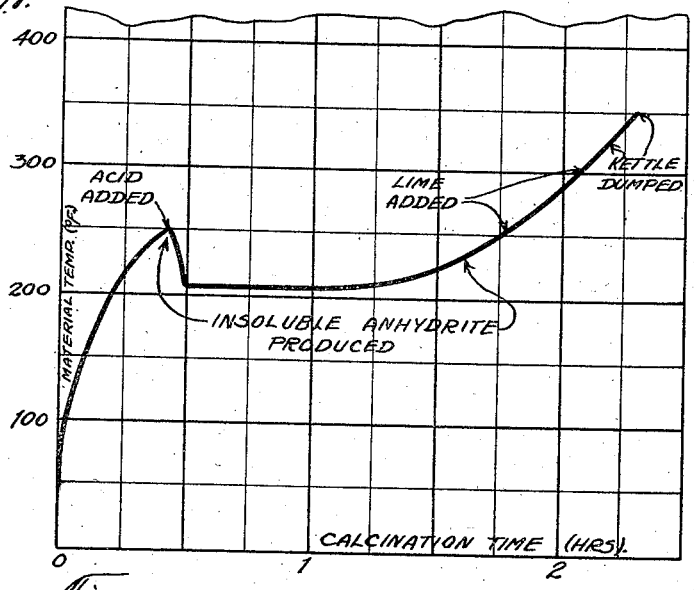
Figure 2 shows temperatures in the kettle during production of insoluble anhydrite with acid added to raw gypsum at the start of the conversion thereof to hemihydrate (Example 1).
Figure 3:
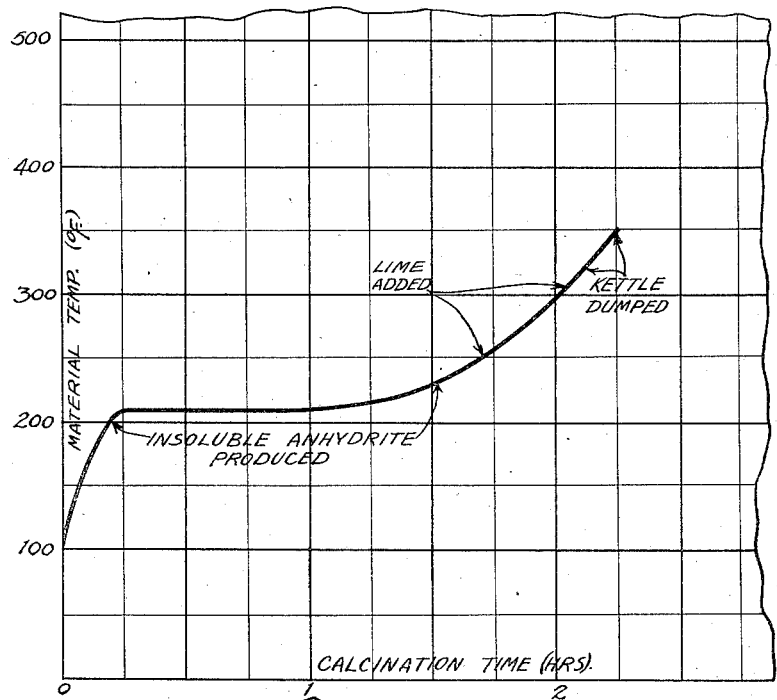
Figure 3 is similar to Figure 2, but with acid added to the gypsum prior to, or during, the filling of the kettle (Example 1, alternate).
Figure 4:
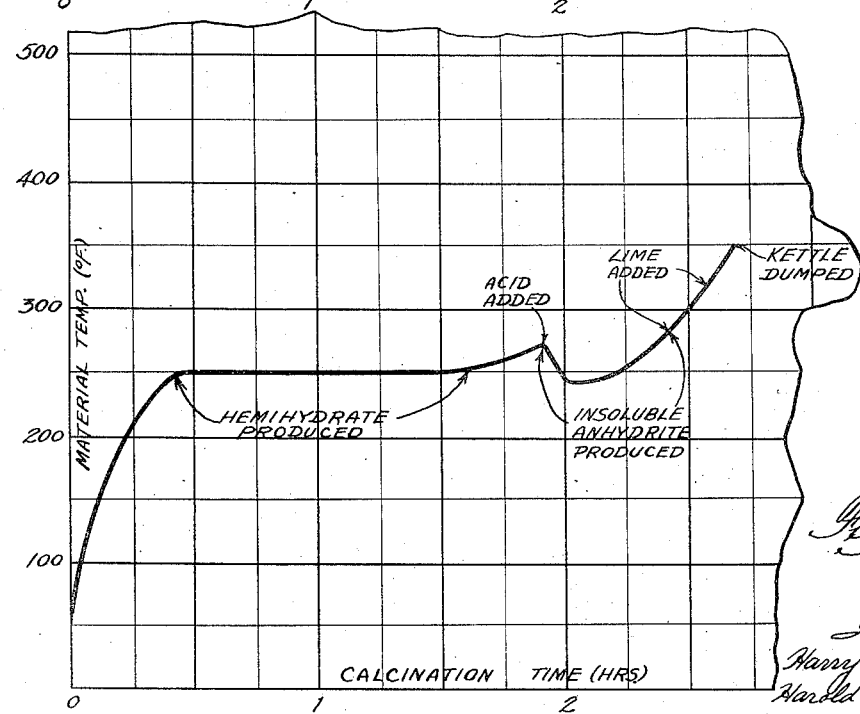
Figure 4 shows kettle temperatures with acid added to the formed hemihydrate at completion of the "drag" (Example 2).
Figure 5:
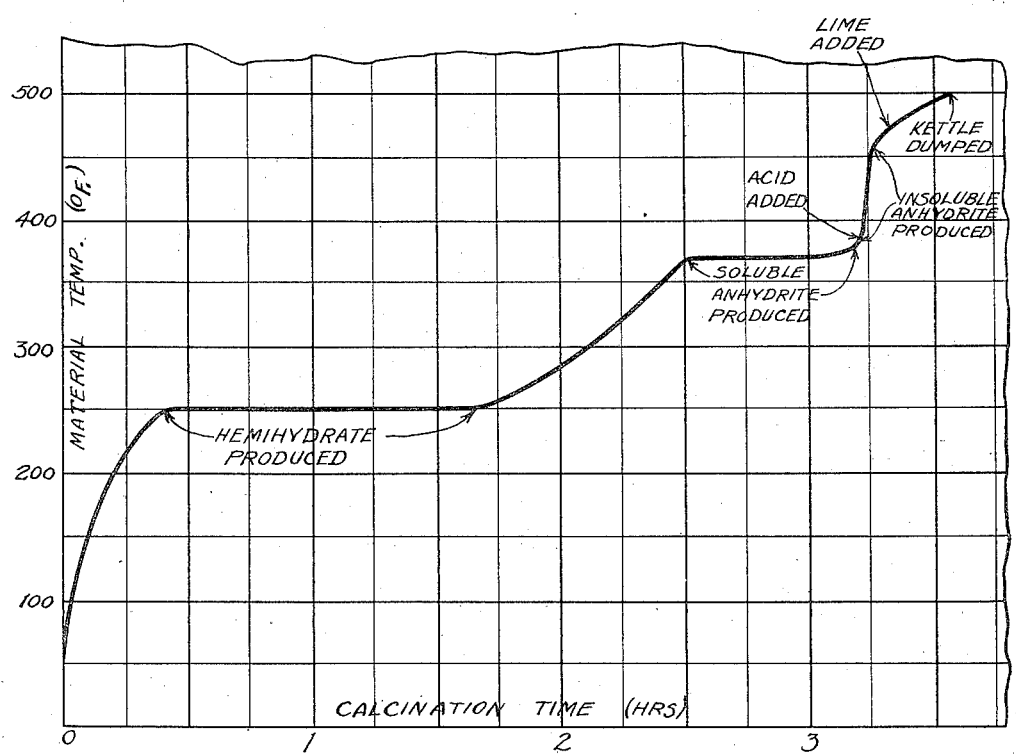
Figure 5 shows kettle temperatures with acid added to "soluble anhydrite" (Example 3).

Rate of heating and size of charge were kept constant and uniform in the determination of the values upon which the figures are based.

The effects of variations in the quantities of added acid are illustrated in Table I. In obtaining this data, pulverized gypsum screening 70% through 100 mesh was charged into a calcining kettle. The temperature of the material in the kettle was raised to 250° F., and acid added in an amount required to neutralize the carbonate impurities present as determined by analysis, plus the excess shown in Table I. Heating was continued to a material temperature of 350°. Sufficient hydrated lime ($Ca(OH)_2$) was added at a material temperature of 300° F. to exactly neutralize any excess acid present and to provide an excess of lime of 0.1–0.2 per cent. After discharge, the materials produced were reground through a swing-hammer screen mill to an approximate fineness of 98% through 100 mesh, and 75%–80% through 325 mesh.

In Table I, the column headed "Per Cent Hydration" refers to percentage of anhydrite reconverted to gypsum ($CaSO_4 \cdot 2H_2O$) after standing in contact with an excess of water at a temperature of 70° F. for the time interval indicated.

tested as described in A. S. T. M. standards, C61—30 and C26—39.

*Table II*

| Type | Material | Method of Preparation | Comb. $H_2O$ | Normal Consistency |
|---|---|---|---|---|
| | | | Per cent | Cc. |
| 1 | Hemihydrate | Kettle calcination | 6.1 | 90 |
| 2 | Soluble Anhydrite | do | 0.8 | 87 |
| 3 | Insoluble Anhydrite | High Temperature Calci. (3 days at 1200° F.) | 0.69 | 57 |
| 4 | do | Kettle Calci. Low Temp. $H_2SO_4$ added to Gypsum (Example 1) | 0.40 | 90 |
| 5 | do | Kettle Calci. Low Temp. $H_2SO_4$ added to Hemihydrate (Example 2) | 0.37 | 58 |
| 6 | do | Kettle Calci. Low Temp. $H_2SO_4$ added to Soluble Anhydrite (Ex. 3) | 0.10 | 50 |
| 7 | do | Kettle Calci. Low Temp. 1% excess $H_3PO_4$ added to Gypsum (Example 4) | 0.18 | 78 |

| | Per Cent Hydration at— | | | Keene's Cements | | | |
|---|---|---|---|---|---|---|---|
| | 1 Hr. | 24 Hrs. | 7 Days | Keene's Consistency (cc.) | Time of Set (Hrs.-Min.) | | Tensile Strength (#/Sq.In.) |
| | | | | | Initial | Final | |
| 1 | 99+ | 100 | 100 | | Flash Set | | |
| 2 | 97.2 | 99+ | 100 | | | | |
| 3 | 3.61 | 6.42 | 16.89 | 44 | 2:38 | 4:44 | 410 |
| 4 | 2.40 | 3.72 | 11.9 | 60 | 2:58 | 4:13 | 375 |
| 5 | 2.10 | 6.22 | 28.6 | 46 | 1:26 | 6:16 | 400 |
| 6 | 0.94 | 2.12 | 9.25 | 32 | 1:46 | 6:00 | 594 |
| 7 | 0.84 | 1.80 (48 hrs.) | 1.80 | 58 | (¹) | (¹) | (¹) |

¹ No set in 12 hours.

*Table I*

| Run No. | Type Acid | Acid Excess Per Cent | Comb. $H_2O$ in Finished Product (%) | Per Cent Hydration At— | Phases Present |
|---|---|---|---|---|---|
| 1 | None | | 6.1 | 1 Hr. 99+<br>48 Hrs. 100<br>7 Days 100 | Hemihydrate. |
| 2 | $H_2SO_4$ | 0.1 | 1.63 | 1 Hr. 27.7<br>48 Hrs. 88.5<br>7 Days 94.0 | Hemihydrate, Soluble Anhydrite and Insoluble Anhydrite. |
| 3 | $H_2SO_4$ | 0.5 | 0.29 | 1 Hr. 2.90<br>48 Hrs. 5.50<br>7 Days 14.5 | Insol. Anhydrite, Traces of Hemihydrate. |
| 4 | $H_2SO_4$ | 1.0 | 0.03 | 1 Hr. 2.40<br>48 Hrs. 3.78<br>7 Days 8.74 | Insol. Anhydrite. |
| 5 | $H_3PO_4$ | 1.0 | 0.18 | 1 Hr. 0.84<br>48 Hrs. 1.80<br>7 Days 1.80 | Do. |

Table II lists comparative characteristics of anhydrites prepared as described under Examples 1–4. Also included are data on insoluble anhydrite prepared by prior art practice of high temperature gypsum calcination, and on ordinary plaster of Paris as made by normal kettle calcination. Gypsum of the same purity was employed in preparation of all the products. Keene's cements were prepared by mixing with each material 0.5% of $K_2SO_4$ and 0.5% of $Al_2(CO_4)_3$.

Normal consistency is defined as cubic centimeters of water which, mixed with 100 grams of powder will produce a slurry of such fluidity that it will just pour from a cup.

Keene's consistency is defined as cubic centimeters of water which, mixed with 100 grams of Keene's cement, will produce a slurry of such fluidity that a penetration of 20±2 mm. shall be obtained with a 350 gram modified Vicat needle, tested as described in A. S. T. M. standards, C61—30 and C26—39.

The product of the present invention, when dispersed in water, readily permits the breaking down of the loosely adherent aggregates so that the resulting dispersion will consist of very small crystals and therefore the suspension will settle very slowly. On the contrary a dispersion of the prior art anhydrite at the same concentration will settle very rapidly. Furthermore, water pastes made from the product of the present invention are plastic and resist suction very well, this being due to the fine particle size and shape of the individual crystals. It is this quality which makes the product of the present invention of particular value for use as a filler in paper coating compositions, as a paint extender, a pigment base, a plastic Keene's cement, etc. As a rubber filler, the present product is far superior to that of prior art $CaSO_4$ fillers in reinforcing and strengthening value, being equivalent to the best types of precipitated whitings in all respects.

The exact mechanism of the reactions involved by the practice of the present invention is not completely understood, and while numerous theories might be proposed, it is not believed that this would add anything worth while to the fullness of the disclosure or to the directions for successfully carrying out the process. It is possible that the added acid first forms an acid calcium sulfate, which then breaks up into the anhydrite and free sulfuric acid. Lowering of vapor pressure in the kettle, due to presence of acid, may so affect phase relationships as to result in direct production of insoluble anhydrite under conditions described. In any event, and irrespective of theory, calcination of gypsum, hemihydrate, or soluble anhydrite in the presence of excess acid results in direct formation of insoluble anydrite at formation temperatures much lower than have been heretofore possible.

In practicing this process, use of a minimum of 0.4–0.5 per cent $H_2SO_4$, based on weight of charge, over and above neutralization requirements is needed to obtain complete conversion to insoluble anhydrite. If lesser amounts of acid are employed the resultant product consists of a complex mixture of hemihydrate, soluble anhydrite, and insoluble anhydrite. The reaction is more positive, and insoluble anhydrite of slower rate of rehydration is obtained as the amount of added acid is increased. Generally, it is preferable to operate within the range of 0.5–2.5 per cent of excess acid, but the process is not to be considered as limited to this range.

"Strength" of acid solution employed is not critical. A more uniform dispersion can be obtained with dilute acid, but this advantage is neutralized by increased acid loss during calcination.

In addition to phosphoric acid and phosphoric anhydride, certain acid sulfate salts have been found to be effective equivalents of sulfuric acid. Ammonium acid sulfate, sodium acid sulfate, and potassium acid sulfate are representative, and may be added to the charge either dry or in solution form.

As indicated, the neutralization of the material is quite advisable unless of course the presence of the acid-reacting material is of no consequence. While lime has been described as the preferred material, primarily because of its cheapness, ready availability, and its lack of interference with the utilization of the product, it is of course possible to employ other alkaline materials for neutralization. Among these are ammonia gas, or solutions of alkalies such as sodium hydroxide, potassium hydroxide, and the like. In general the neutralizing material is added while the formed anhydrite is still in the kettle, as this affords an easy means of operation and good control of neutralization and blending, but neutralization may be done by mixing after completion of calcination, or the product may be used without neutralizing, if desired. In general, a very slight excess of the alkaline material, say from .01–0.2% (calculated as calcium hydroxide) is desired, particularly if the product is to be employed in the form of Keene's cement.

If anhydrite made in accordance with the present process is allowed to remain on the acid side of neutrality, Keene's cement made from it will have a slower setting time and a lower strength than similar cement made from anhydrite which has been completely neutralized and rendered slightly alkaline.

In practicing our process, the raw material, in addition to being either the natural calcium sulfate dihydrate, hemihydrate, or soluble anhydrite, may also be a form of hemihydrate which has been artificially pre-aged, for example, the so-called "aridized" stucco as described in Brookby Patent No. 1,370,581.

Also, the so-called "alpha" gypsum made in accordance with the Randel and Dailey Patent No. 1,901,051, may be employed as the starting material. When so used, this "alpha" gypsum will produce an anhydrite of very low consistency, and thus be capable of producing an extraordinarily high strength Keene's cement.

It might also be mentioned that the process of the present invention even differs in its visual appearance from the former kettle calcination of gypsum and from the manufacture of plaster of Paris. Without the use of acid, that is in the ordinary kettle calcination, the gypsum appears to boil during its conversion to the hemihydrate or the soluble anhydrite. The release of the water in the form of steam tends to fluff up the product and therefore keep it more or less light, fluid and easily agitated by the mechanical stirrers in the kettle. On the contrary, and when practicing the present invention, and despite the fact that the rate of release of the combined water in the form of steam is even faster than during normal calcination without acids, the physical action which can be observed in the kettle is quite different. The so-called "boiling" action is not as uniform and as general, and the material appears to be heavy and dead, and difficult to agitate. For this reason, and to promote uniformity in the production of the present product and to assure more efficient and greater heat transfer, it is desirable to provide more positive means of agitation than are commonly employed in the calcining kettles. Thus it has been found that it is very advantageous to blow steam into the kettle during the calcination both as an aid to agitation and to keep the material uniformly mixed.

We prefer to inject the steam through pipes or openings which have their outlets near the bottom of the kettle. While air agitation may be employed, the resultant product is not as uniform as when steam is used. This use of steam is considered as also a part of the present invention and is consequently claimed herein.

In general it is advisable to carry out the process in kettles which are provided with acid-resisting linings, so as to avoid corrosion of the kettles and iron contamination of the finished product. After neutralization, the material may be handled or processed further through standard steel equipment. The further handling of the product such as regrinding by means of impact mills, ball mills, or other types of grinders, follows the time-honored procedure in the handling of gypsum products and is familiar to the art.

What is claimed as new is:

1. Process of making insoluble anhydrite which comprises heating substantially dry finely powdered gypsum to a temperature of about 250° F., then adding thereto from about 0.5% to 5.0% of its weight of concentrated sulfuric acid in excess of that required to neutralize impurities contained in said gypsum, and continuing the heating to about 300° F. until substantially all of the combined water of crystallization has been driven from the gypsum, thereupon neutralizing the sulfuric acid by an excess of lime, and cooling the resulting product.

2. The process of claim 7, in which said gaseous substance is steam.

3. The process of claim 7 in which said gaseous substance is air.

4. Process of making the insoluble anhydrite form of calcium sulfate from other types of calcium sulfate of the group consisting of hydrated forms of calcium sulfate and soluble anhydrite which comprises calcining said other forms of calcium sulfate in the form of a substantially dry powder at a temperature within the range of from about 212° F. to about 475° F. in the presence of not over about 10% by weight, in excess of that required to neutralize impurities in said calcium sulfate, of an inorganic strongly acid-reacting substance having a strong dehydrating effect and selected from the group consisting of acids and acid salts until substantially all of the combined water of crystallization has been driven from the calcium sulfate.

5. Process of making insoluble anhydrite from gypsum which comprises calcining substantially dry finely powdered gypsum within a temperature range of from about 250° F. to about 400° F. in the presence of about from 0.5% to 10% by weight, in excess of that required to neutralize impurities in said gypsum, of an acid-reacting substance selected from the group consisting of inorganic acids and acid salts having a strongly dehydrating effect, until substantially all of the combined water of crystallization has been driven from the gypsum.

6. Process of making insoluble anhydrite which comprises mixing finely divided powdered gypsum with from about 0.5% to 10% by weight, in excess of that required to neutralize impurities in said gypsum, of a substance selected from the group consisting of inorganic acids and acid salts that assert a strongly dehydrating action, and heating the resulting mixture to from about 212° F. to about 475° F. until substantially all of the combined water of crystallization has been driven from the gypsum.

7. Process of making the insoluble anhydrite form of calcium sulfate from other types of calcium sulfate of the group consisting of hydrated forms of calcium sulfate and soluble anhydrite which comprises calcining said other types of calcium sulfate in the form of a substantially dry fine powder at a temperature within the range of from about 212° F. to about 475° F. in the presence of not over about 10% by weight, in excess of that required to neutralize impurities in said calcium sulfate, of a substance from the group consisting of inorganic acids and acid salts having a strongly dehydrating effect, while blowing through the mass of powdered calcium sulfate during the calcination a gaseous substance to assist in the elimination of the liberated water vapor from the product, said calcining being continued until substantially all of the combined water of crystallization has been driven from the calcium sulfate.

8. The process according to claim 4 in which the acid-reacting substance is sulfuric acid.

9. The process according to claim 5 in which the acid-reacting substance is phosphoric acid in an amount not substantially less than about 1% of $H_3PO_4$ on the basis of the weight of the gypsum, in excess of acid required for neutralization of the impurities in said gypsum.

10. The process according to claim 5 in which the acid-reacting substance is a mineral acid substantially non-volatile within the stated calcination range.

11. Process of making insoluble anhydrite which comprises calcining calcium sulfate hemihydrate in substantially dry finely divided form at a temperature below 375° F. in the presence of from about 0.5% to about 10.0% by weight, in excess of that required to neutralize impurities in said calcium sulfate hemihydrate, of a substance selected from the group consisting of strongly dehydrating inorganic acids and acid salts substantially non-volatile at 375° F., until substantially all of the combined water of crystallization has been driven from the calcium sulfate hemihydrate.

12. The process according to claim 11 in which the substance is sulfuric acid.

13. The process according to claim 11 in which the substance is phosphoric acid in an amount not substantially less than about 1% of $H_3PO_4$ on the basis of the weight of the calcium sulfate hemihydrate in excess of that required to neutralize the impurities in said calcium sulfate hemihydrate.

14. Process of making insoluble anhydrite which comprises heating finely divided substantially dry soluble anhydrite at a temperature between about 212° F. and about 500° F. in the presence of from about 0.5% to about 10% by weight, in excess of that required to neutralize impurities in said soluble anhydrite, of an inorganic strongly dehydrating substance selected from the group consisting of acids and acid salts substantially non-volatile within the above temperature range, until substantially all of the combined water of crystallization has been driven from the said soluble anhydrite.

15. The process of claim 14 in which the substance is sulfuric acid.

16. The process of claim 14 in which the substance is phosphoric acid in an amount not substantially less than about 1% of $H_3PO_4$ on the basis of the soluble anhydrite, in excess of that required to neutralize impurities in said soluble anhydrite.

17. The process according to claim 4 in which the acid-reacting substance is neutralized after it has performed its function.

18. The process according to claim 4 in which the acid-reacting substance is neutralized by means of lime after it has performed its function.

HARRY K. LINZELL.
HAROLD E. SIMPSON.
MANVEL C. DAILEY.

REFERENCES CITED

The following references are of record in the file of this patent:

UNITED STATES PATENTS

| Number | Name | Date |
|---|---|---|
| 1,798,857 | Tyler | Mar. 31, 1931 |
| 2,046,054 | Booge | June 30, 1936 |
| 2,222,385 | Washburn | Nov. 19, 1940 |
| 2,326,157 | McCord | Aug. 10, 1943 |
| 1,151,331 | Roberts | Mar. 21, 1939 |
| 2,151,339 | Sullivan | Mar. 21, 1939 |
| 2,006,342 | Booge | July 2, 1935 |
| 2,031,898 | Marsh | Feb. 25, 1936 |
| 2,220,289 | Saunders | Nov. 5, 1940 |